United States Patent [19]

Macri et al.

[11] Patent Number: 5,647,747

[45] Date of Patent: Jul. 15, 1997

[54] MECHANIZED ROBOTS FOR USE IN INSTRUCTION, TRAINING, AND PRACTICE IN THE SPORT OF ICE AND ROLLER HOCKEY

[75] Inventors: Vincent J. Macri, 5 Timber Brook La., Durham, N.H. 03824; Robert O. Magaw, Carle Place; Paul Zilber, Plainview, both of N.Y.

[73] Assignee: Vincent J. Macri, Durham, N.H.

[21] Appl. No.: 375,617

[22] Filed: Jan. 20, 1995

[51] Int. Cl.$^6$ ............................................. A63B 69/00
[52] U.S. Cl. ........................................ 434/247; 473/446
[58] Field of Search .................................. 434/247, 251; 273/57.2; 482/87, 86, 83

[56] References Cited

U.S. PATENT DOCUMENTS

| | | | |
|---|---|---|---|
| 730,956 | 6/1903 | Needham | 472/90 |
| 2,153,384 | 4/1939 | Mazza | 273/55 |
| 3,765,675 | 10/1973 | DiMarzio | 273/57.2 |
| 3,898,438 | 8/1975 | Nater et al. | 235/151 |
| 4,021,651 | 5/1977 | Mitsuhashi et al. | 235/151.11 |
| 4,085,540 | 4/1978 | Jernstrom et al. | 46/119 |
| 4,534,557 | 8/1985 | Bigelow et al. | 434/247 X |
| 4,688,792 | 8/1987 | Rivkin | 272/76 |
| 4,752,764 | 6/1988 | Peterson et al. | 340/323 |
| 4,805,631 | 2/1989 | Roi du Maroc, II | 128/710 |
| 4,941,660 | 7/1990 | Winn et al. | 434/247 X |
| 5,048,822 | 9/1991 | Murphy | 482/87 X |
| 5,100,138 | 3/1992 | Wilde | 273/85 R |
| 5,224,710 | 7/1993 | Feokhari | 273/247 |
| 5,249,967 | 10/1993 | O'Leary et al. | 434/247 |
| 5,280,905 | 1/1994 | Micco | 482/87 X |
| 5,312,109 | 5/1994 | Cagle | 273/411 |
| 5,344,323 | 9/1994 | Burns | 434/250 |
| 5,363,297 | 11/1994 | Larson et al. | 364/410 |
| 5,503,606 | 4/1996 | Stephens | 482/87 X |

FOREIGN PATENT DOCUMENTS

| | | | |
|---|---|---|---|
| 1071225 | 2/1980 | Canada | 273/57.2 |
| 1200917 | 12/1985 | U.S.S.R. | 434/247 |
| 1405858 | 6/1988 | U.S.S.R. | 482/83 |

OTHER PUBLICATIONS

M. Okui, et al., "Locus Display of Moving Sports Players," *8012 SMPTE Journal* 96 (7):667–673 (July. 1987).

*Primary Examiner*—Jeffrey A. Smith
*Attorney, Agent, or Firm*—Hamilton, Brook, Smith & Reynolds, P.C.

[57] ABSTRACT

The invention comprises one or more electro-mechanical robots in human form designed to resemble hockey player (s). The robots are suspended from a movable overhead track and powered by motorized cars along a variety of courses, all of which causes the robots to move at the speed(s) and follow the skating pathways used in hockey plays and maneuvers. The elevation, speed and pathways followed by the robots are selected from a computer menu. The robots may be used for instructing and training skaters in the skills, maneuvers and plays essential to the sport of ice (and roller) hockey. The robots are designed to provide a teaching/learning tool and to be used in conditions which realistically resemble those that skaters/players encounter in real hockey games. Robots are equipped with sensor chips which, when impacted by the skater, will provide measurable data regarding the skater's performance during training sessions. Feedback will also be provided via video recordings of the training sessions and by other means, such as digitized images of the skater(s) and robot(s). The overhead tracks from which the robots are suspended may be raised to a position far above the ice surface when robots are not in use, so as to provide a clear rink to be used for other purposes.

10 Claims, 10 Drawing Sheets

MECHANIZED ROBOTS FOR USE IN INSTRUCTION, TRAINING, AND PRACTICE IN THE SPORT OF ICE AND ROLLER HOCKEY

BACKGROUND OF THE INVENTION (1) Field of the Invention

This invention relates to an electro-mechanical robot(s) in human form, outfitted as a hockey player(s) and, more particularly, to the use of such a robot(s) for instruction, practice and acquiring fundamental skills in ice and roller hockey.

(2) Description of the Prior Art

Devices currently used for instruction, practice and skills development in ice and roller hockey include:

(1) nylon parachutes pulled by the skater(s) (used to increase drag, and therefore, the skater's leg strength by overcoming the drag), (2) surgical tubing attached to a harness on the skater's shoulders and, at the lowest point, to the skates causing the skater to bend at the knees and waist while skating (a preferred skating position for ice and roller hockey), (3) lengths of wooden boards (or hockey sticks) placed on the ice for practicing jumps and other skating maneuvers, and (4) orange plastic traffic cones, used as pathmarkers for skating drills.

Devices (1) and (2) mentioned above are designed to increase the skater's strength and skating ability but do not provide instruction/practice in the maneuvers and skills which are particular to ice and roller hockey.

Devices (3) and (4) described above (i.e. the use of wooden boards and orange plastic traffic cones) are used to practice skating maneuvers in ice and roller hockey but suffer from their placement (on the surface of the ice), which is to say that the skater is forced to pay undue attention to the surface of the ice.

An accepted principle in ice hockey is that players should play "heads up" hockey. Playing "heads up" requires players to be sufficiently skilled in skating and stickhandling so as to move at variable speeds, execute a variety of maneuvers, and control the puck while maintaining direct and peripheral vision of on-ice conditions, i.e. maintain a field of vision to teammates and opponents and the opposing goal net. The mastery of "heads up" hockey is essential to the players' ability to dynamically change position (location on the ice), to avoid collision which could lead to injury or being taken out of the play (or both), and to anticipate or "read" the moves of opponents. Orange cones, wooden boards, and other devices of any kind when placed on the ice surface, and used as pathmarkers (for players who are executing forward and backward skating and stickhandling skills) range from suboptimal to detrimental in that they cause players to unduly focus on the ice surface. The surface of the ice is not where a player's focus should be in order to play "heads up" ice hockey.

None of the foregoing devices, or any other known devices, present a realistic, simulation of an opponent against whom players may test their skills, maneuvers and plays. There are minimally dozens and maximally hundreds of moves that are mastered by accomplished hockey players. The most efficient way to repeat authentic situations (even those that are rare), and therefore, master skills, moves, maneuvers and plays is through the use of controlled, robotic opponents.

SUMMARY OF THE INVENTION

The invention comprises one or more electro-mechanical robots in human form, outfitted to resemble hockey player(s). The object of this invention is to provide enhanced instruction/practice in ice hockey. Use of these robotic aides will increase the players' on-ice skills and abilities. The robotic training devices are designed to simulate actual conditions and to provide increased levels of complexity and challenge in the skills, maneuvers and plays that must be practiced in order to play ice hockey. Computerized means will enable instructors to pre-select formations, movements, elevation and speed. Precise and timely feedback on the results of individual and team performance is provided. Feedback is obtained from sensing devices within the robots. This data (or the absence thereof, e.g. the execution of a drill without touching the robot) is transmitted to the computer and used in conjunction with images obtained by video cam recorder (or other filming or action recording device).

The robots are suspended from an overhead track which enables movement along any of a variety of courses, all of which are designed to simulate path patterns followed during hockey games. The design of the invention will enable players to learn and to practice in realistic conditions and to repeat moves and drills needed to master the maneuvers, tactics and plays essential to ice hockey. Players will also develop skills in the main physical/athletic components (building blocks) of ice hockey; these are (1) agility, (2) balance, (3) form, (4) impact, (5) speed, (6) strength, and (7) timing.

Each robot is designed to contain a series of sensors capable of transmitting information on each player's performance to a training computer. The training computer evaluates the data received from each robot and provides real time feed-back which can be used to evaluate individual and group performance.

DETAILED DESCRIPTION OF THE INVENTION

Figure 1A:
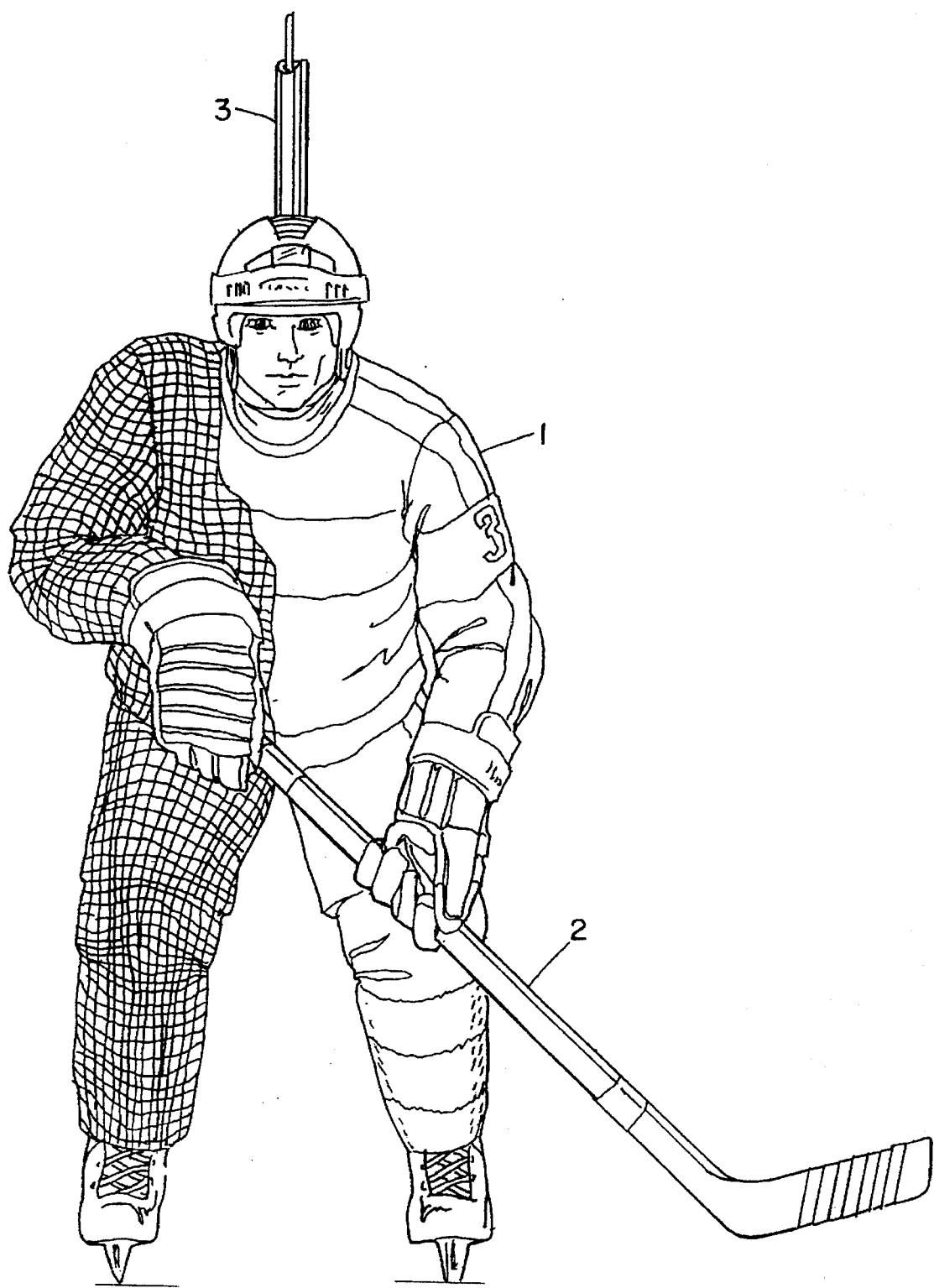
FIG. 1a is a front view of a mechanized robot designed according to the present invention to resemble a hockey player.
Figure 1B:
FIG. 1b is a side view of a mechanized robot.

Referring to FIG. 1a, the invention comprises a robot, or series of robots, each resembling a hockey player(s). FIG. 1b shows a side view of one of the robots. For each of the seven physical/athletic building blocks that should be mastered by an aspiring hockey player, the robots serve as sensing, obstructing, resisting, measuring and recording devices.

The robots wear uniforms 1 designed to resemble those currently used in the sport or alternatively, special colors to connote particular formations or desired movements for instruction and practice purposes (for example, solid black for robots "playing" defense, solid yellow for robots "playing" offense). Human features can be added to the face, which is the only exposed area on the robots.

The initial design of the invention comprises robots built in two sizes. The larger is approximately 72 inches high (from the top of the helmet to the bottom of the skate) and 30 inches wide (from shoulder to shoulder). The sizes, for younger players are either 30% or 16.6% smaller.

Each robot holds a hockey stick 2 (either right or left handed), which can be adjusted to any one of four stationary vertical positions or programmed to move vertically so that the blade of the stick (at its lowest point) is from ¼ inch above the ice to (at its highest point) 50 inches above the ice.

Each robot is covered with high impact padding fitted over a plastic, metal or carbon/graphite composite material armature (or frame). These materials were chosen for the armature as the preferred embodiment of the invention because of their strength, resilience, and impact resistance. The impact padding can be made of any number of commercially available urethane foams. This material is frequently used in athletic equipment to prevent injury and will retain its shape after impact.

In alternative forms of the invention the armature may be made of combinations of metal, metal alloys, or a composite "space age" material similar to that currently used in some hockey sticks. The scope of this patent should not be limited by the materials used in creating the armature or padding.

Figure 2:
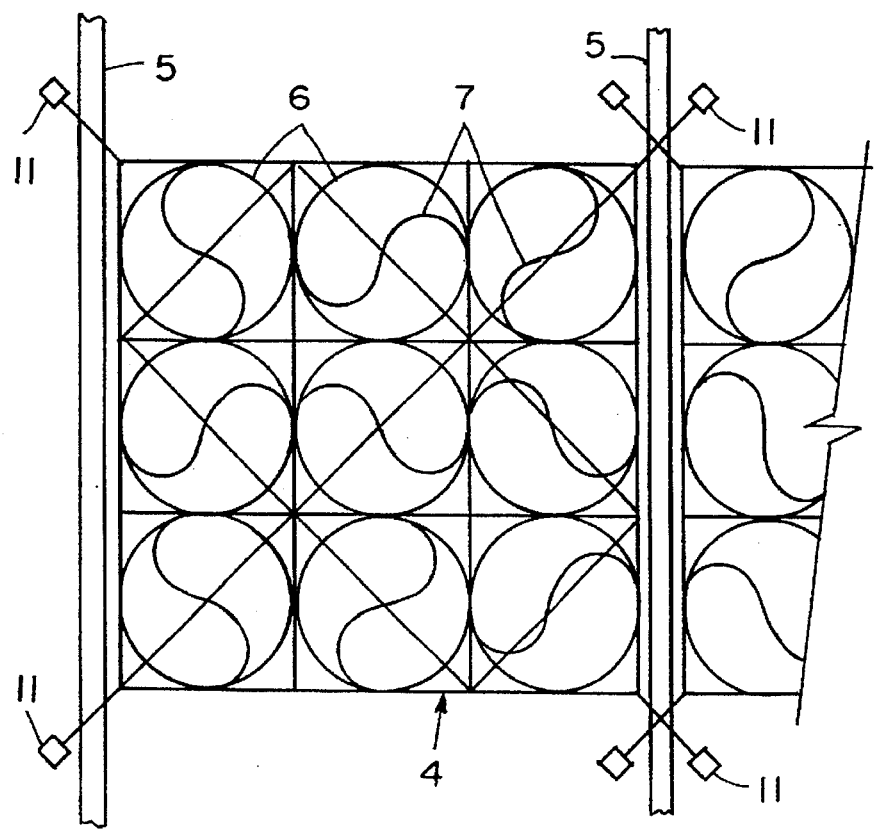
FIG. 2 is a plan schematic of the track assembly from which the robots are suspended including the hoist point locations.

Robots are suspended from 2-inch diameter stainless-steel suspension tubes 3 attached to overhead tracks 4 (FIG. 2) which are in turn connected to the building's frame 5. The robots are suspended approximately ¼ inch above the surface of the ice. The overhead track is laid out in a series of connected circles 6 containing figure S's 7 that enable the robots to move on any number of different "skating paths". The circles can be manufactured so that they rotate within the track assembly, thus enabling an increased number of paths which the robots may follow. The particular path followed by the robots will be selected from a computer software program that will enable the instructor or player to plan specific drills, formations and plays for practice sessions.

Figure 3:
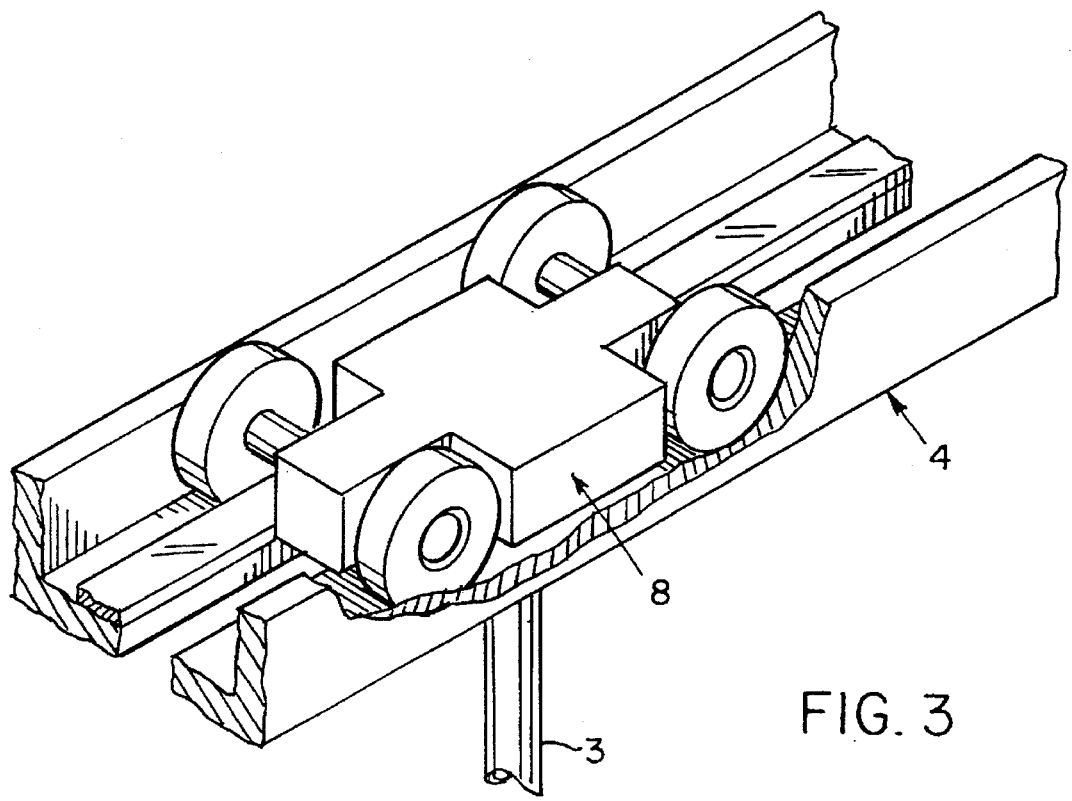
FIG. 3 is a detailed illustration of the motorized car which runs inside the track assembly.

The motoring device that moves the robots is a simple, direct current motor that runs on a steel buss track in a similar manner to an electrified locomotive or an old-fashioned electromotive bus. The conductive material inside the tracks can be made of copper or a copper alloy. The motor is encased in a wheeled car 8 (FIG. 3) which moves inside the track 4. The body of the car can be cast or formed from a durable material such as iron. Two wheels of the car are designed to conduct electricity, and in the preferred embodiment of the invention, are made of copper rods. The remaining two wheels are rubberized.

In an alternative embodiment of the invention a conductive brush may be attached to the motorized car. The brush would contact the electrified portion of the track in a similar manner to bumper cars in an amusement park. These and other types of mechanisms for powering the motorized cars are anticipated by this patent.

A simple potentiometer controls the speed at which the robots move along the track and across the ice. Increases and decreases in the voltage fed to the potentiometer will allow the robots to increase or decrease speed during maneuvers.

Figure 4A:
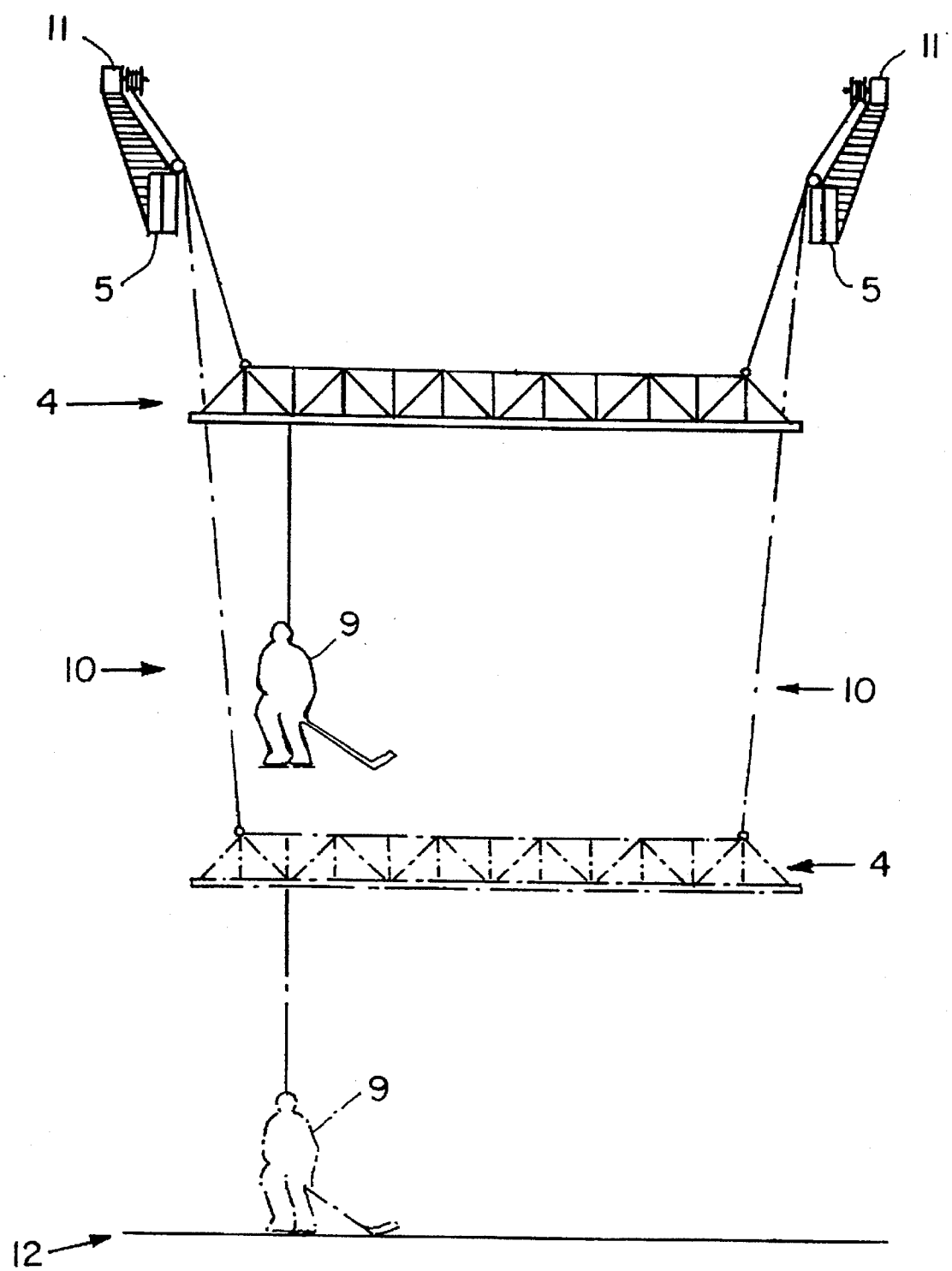
FIG. 4a is an elevation schematic of a track assembly in the raised and lowered positions.

When not used, the robots 9 and track 4 can be raised to a position 10 above the ice where they will not interfere with other activities on the surface (FIG. 4a). Four hoist motors 11 will be used to raise the track assembly to a position approximately 32 feet above the ice surface 12. The ice rink may then be used for hockey games, practice sessions, or other purposes.

Figure 4B:
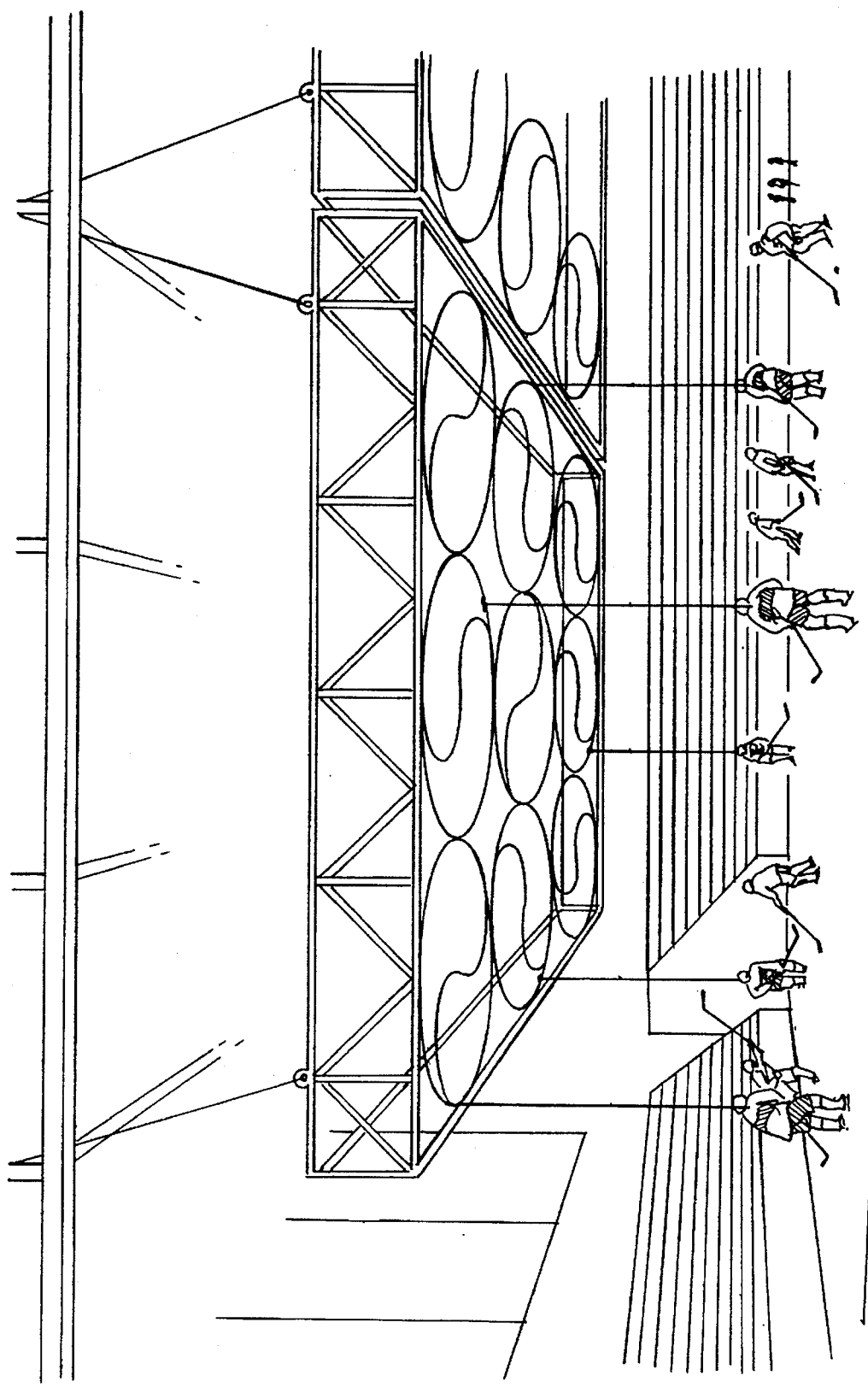
FIG. 4b is a perspective view of the robots and track assembly in the lowered position.
Figure 4C:
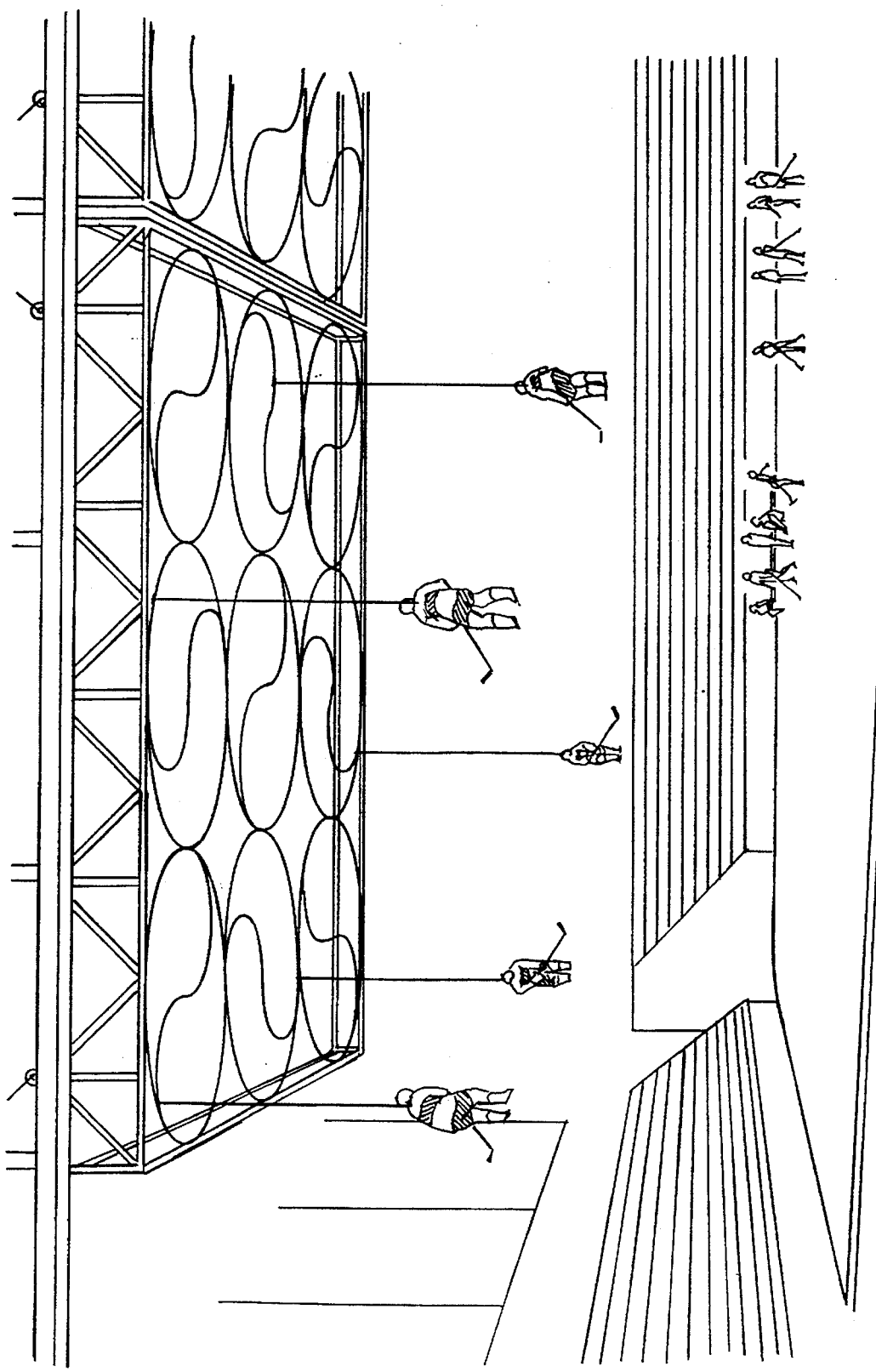
FIG. 4c is a perspective view of the robots and track assembly in the raised position.

FIG. 4b shows a perspective view of the robots in the lowered position as they are used during a training session. FIG. 4c shows the robots raised above the surface of the ice.

Figure 5A:
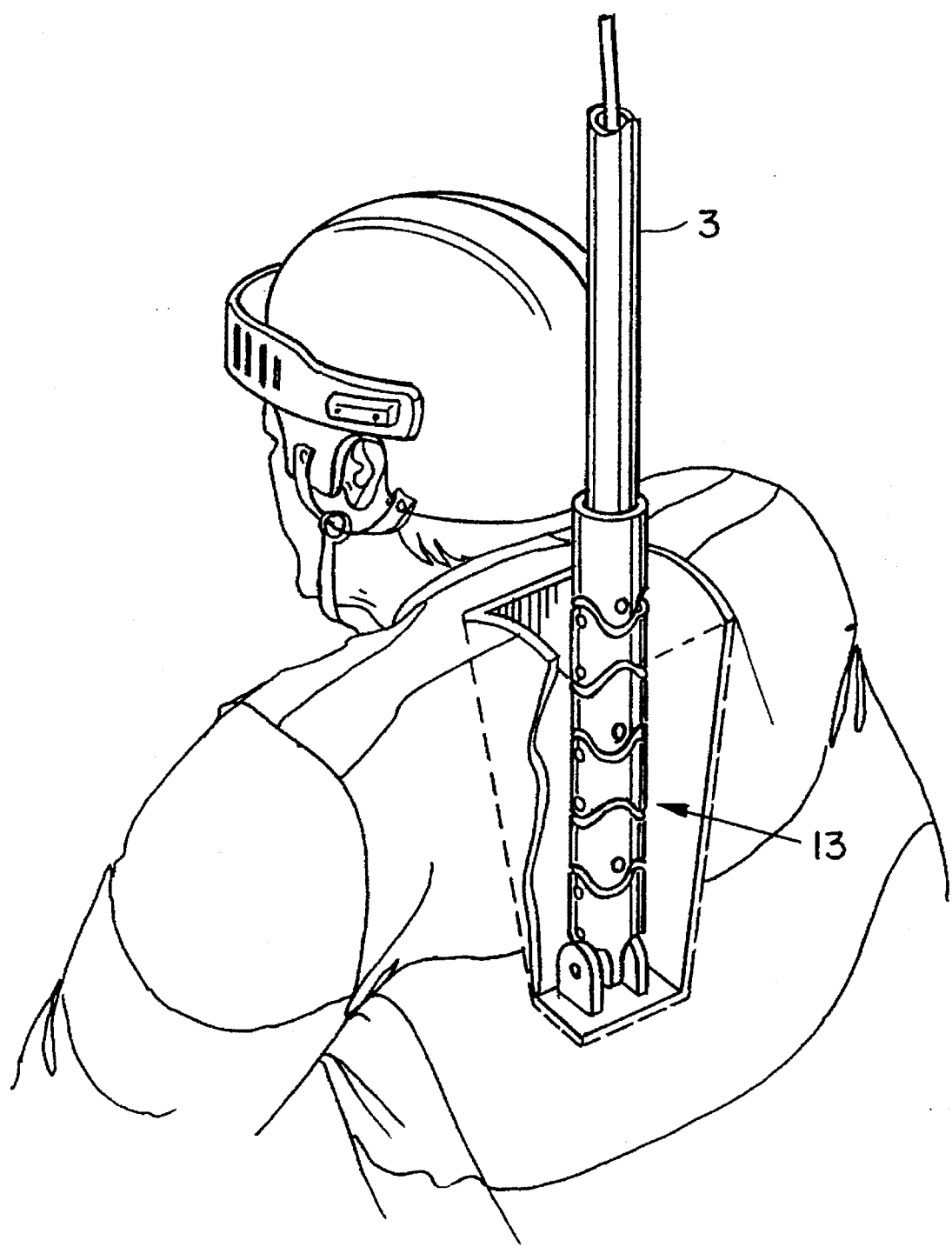
FIG. 5a is a rear view of a mechanized robot illustrating the multiple universal joint which controls resistance and sway.
Figure 5B:
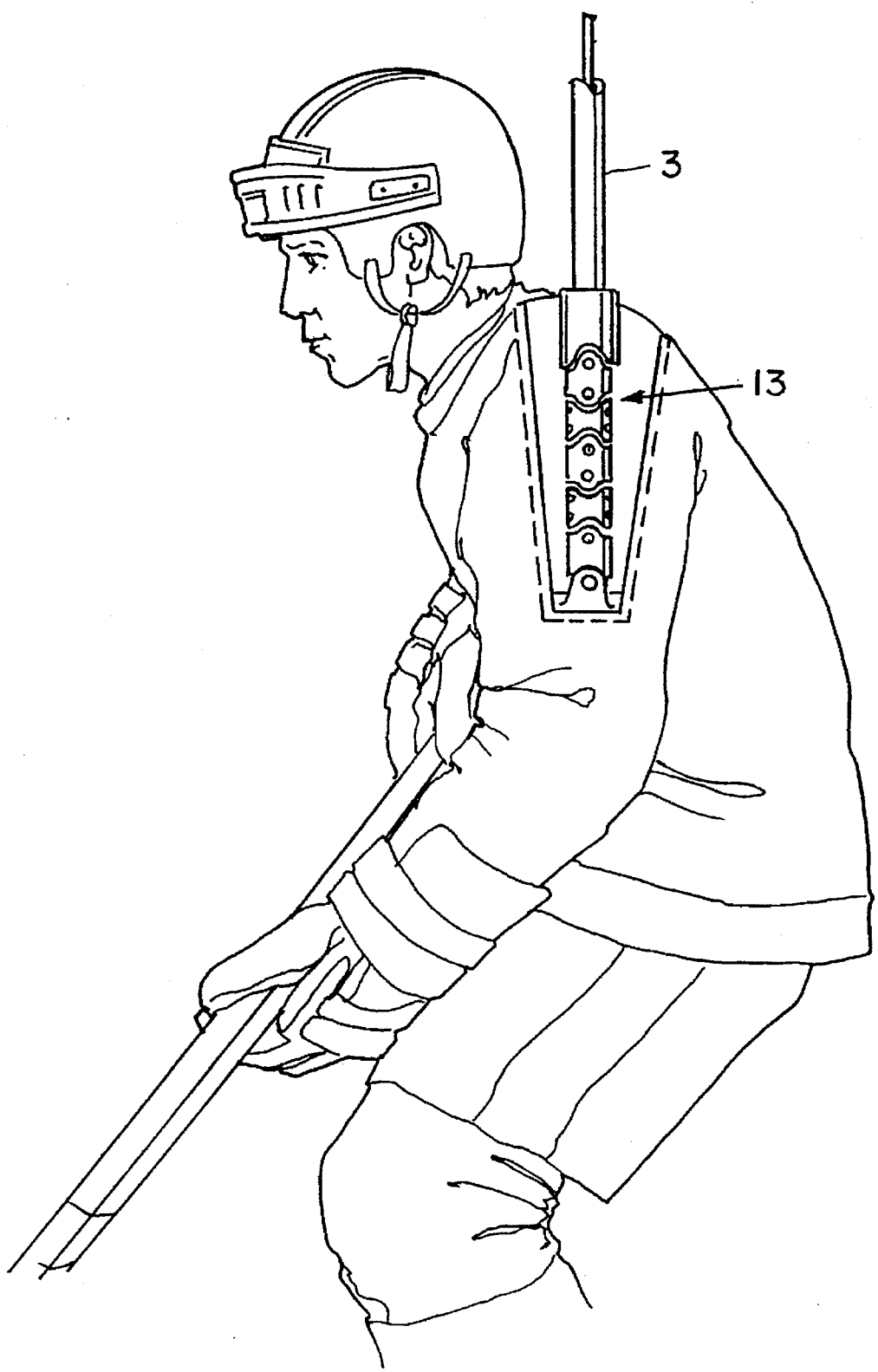
FIG. 5b is a side view of a mechanized robot illustrating the multiple universal joint.
Figure 6B:
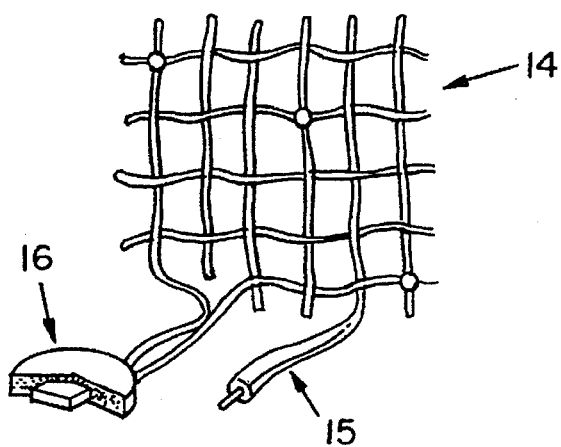
FIG. 6 is a front view of a mechanized robot with a detailed illustration of a section of the sensor mesh.
Figure 6A:
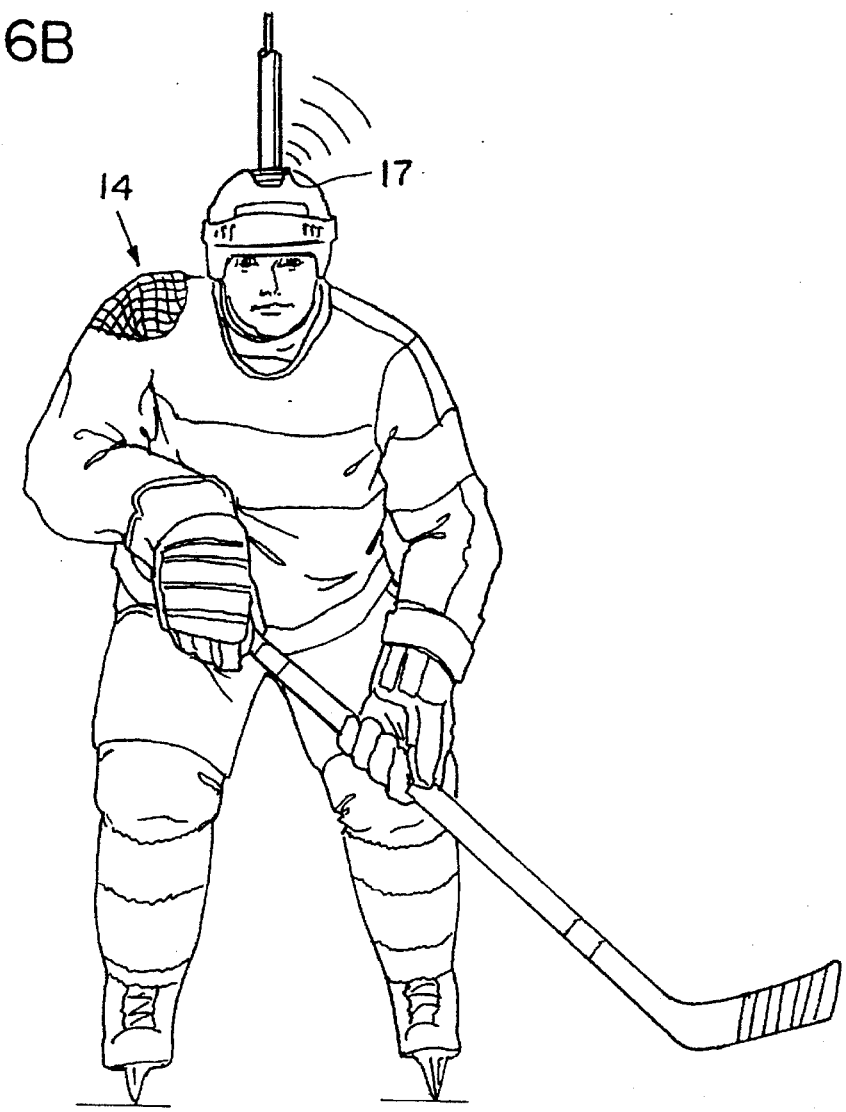

Referring to FIG. 5a, the steel tubes which suspend the robots from the track assembly are connected to the robots by a multiple universal joint 13 that is controlled by electromagnetic force. FIG. 5b shows a side view of the multiple universal joint. By increasing or decreasing the flow of electricity, and thereby, the rigidity or flexibility of the joint, the instructor or trainer is able to vary the degree of resistance the robot will offer upon contact by a player. Electric current will also control the sway of the robot during movement across the ice. By varying the amount of resistance and sway and allowing the player to avoid or intentionally make contact with a robot, agility, balance, impact, speed, strength, and timing can be measured.

Beneath the uniform, the robots are covered with a flexible fabric containing a grid-like mesh 14 comprised of micro volt wiring 15 connecting a series of silicone sensor chips 16, much like those used in pressure sensitive alarms that measure touch and force. The sensor mesh enables the contact between a player and a robot to be detected and measured. Each sensor chip impacts or "checks" measures the force at which the player impacts or hits the robot. The amount of force is measured in terms of electrical voltage which is then "digitized" by an analog to digital converter into a single value. This value is transmitted and stored by the computer system. Connected chips measure the magnitude of the check over the area of contact. In the preferred embodiment of the invention, the sensor mesh will be powered by lithium batteries, alternatively, the sensor mesh may be powered by motive power drawn via the suspension tube.

In the preferred embodiment of the invention, each robot will be equipped with a small, shielded, battery-powered radio transmitter 17 which sends a frequency unique to that particular robot. When the player checks or otherwise contacts the robot, impact measurements from the sensor chips are sent by microwave frequency to a receiver in the training area. Separate frequencies for each robot allow for the identification of each players' impact measurements.

In an alternate form of the invention a unique identification code may be assigned to each robot. When data is transmitted by the robot, the identification code would be transmitted first enabling the computer to uniquely identify each robot.

In an additional embodiment of the invention, an electric wire may connect the sensor mesh to a data strip on the motorized car. Data would then be communicated electronically along the track assembly to the computer.

The transmissions from the robots may be received in a variety of ways by the computer. In one embodiment, the computer may receive transmissions from each robot in a sequential order, allocating a certain period of time for the transmission from each robot. When transmissions have been received from each robot, the computer will begin again with the first robot. Alternatively, the computer may receive transmitted data only when a new reading (i.e. new impact data) has been measured by an individual robot.

In the preferred embodiment of the invention, readings from each sensor chip within an individual robot will be transmitted sequentially to the computer. An alternative embodiment of the invention would allow the computer to read each sensor chip within an individual robot simultaneously. Those skilled in the art will realize that the scope of this invention should not be limited to the form in which data is transmitted to the computer.

The numerical measurements transmitted by each of the robots used during the instruction/practice session are received and stored by the computer. This enables the measurements to be fed-back from the computer to the instructors and players. Feed-back can occur in "real-time" and/or results can be played back in review sessions with the students (or printed-out in hard copy).

Video cameras will also record the training sessions between the students and the robots. The video images can be used to evaluate (and later correct, if necessary) the student's form and technique used during the practice session. This will enable the student to develop essential basic skills and more advanced skills such as play set up strategy and play react strategy.

The video images can be viewed along with the data transmitted by each robot during the practice session. The video images are coordinated with the computer data from the robots and displayed simultaneously. A synchronization switch will insure that the video recordings and the data measured by the robots are coordinated by time.

Each check (physical impact), pass, play, shot or other maneuver recorded by the video cameras is displayed along with data describing force, location of impact, speed, and avoidance of contact (zero (0) contact being the highest avoidance score; indicating that the player has used acceptable speed during the drill). A "grid template" of the robot will be layered over the video image to show the location (or absence) of impact as a measure of the successful execution of a drill. The grid will be color-coded in a similar manner to a weather map to indicate the force of impact in different locations on the robot.

In the preferred embodiment of the invention, overlay viewing of the data during video replay of practice sessions will include a computer display of practice results. For example, the display for unit number 6 (robot number 6) will indicate that "X" checks were received at "Y" magnitude of force. The display will also include "Z", the location of impact in numbers as well as a display of the area of contact on the template grid overlay. The information displayed will enable the instructor and student to view and to interpret the interaction between the student and the robot for each check (i.e. the difference between a glancing impact or a solid check) based on visual as well as measured ability.

The impact data can be used by the computer to calculate speed and force using simple formulas, F=MA, V=AT. The letter "M" represents mass (normally measured as weight) which can be specified/measured for each student. Measurements can also be made of the student's post-check "recovery".

The measurement of impact force, impact speed, agility, balance, play set up strategy, and play react strategy are combined to form an overall review and learning matrix that allows for enhanced training and therefore a quicker, more efficient grasp of the skills required of aspiring hockey players.

Figure 7:
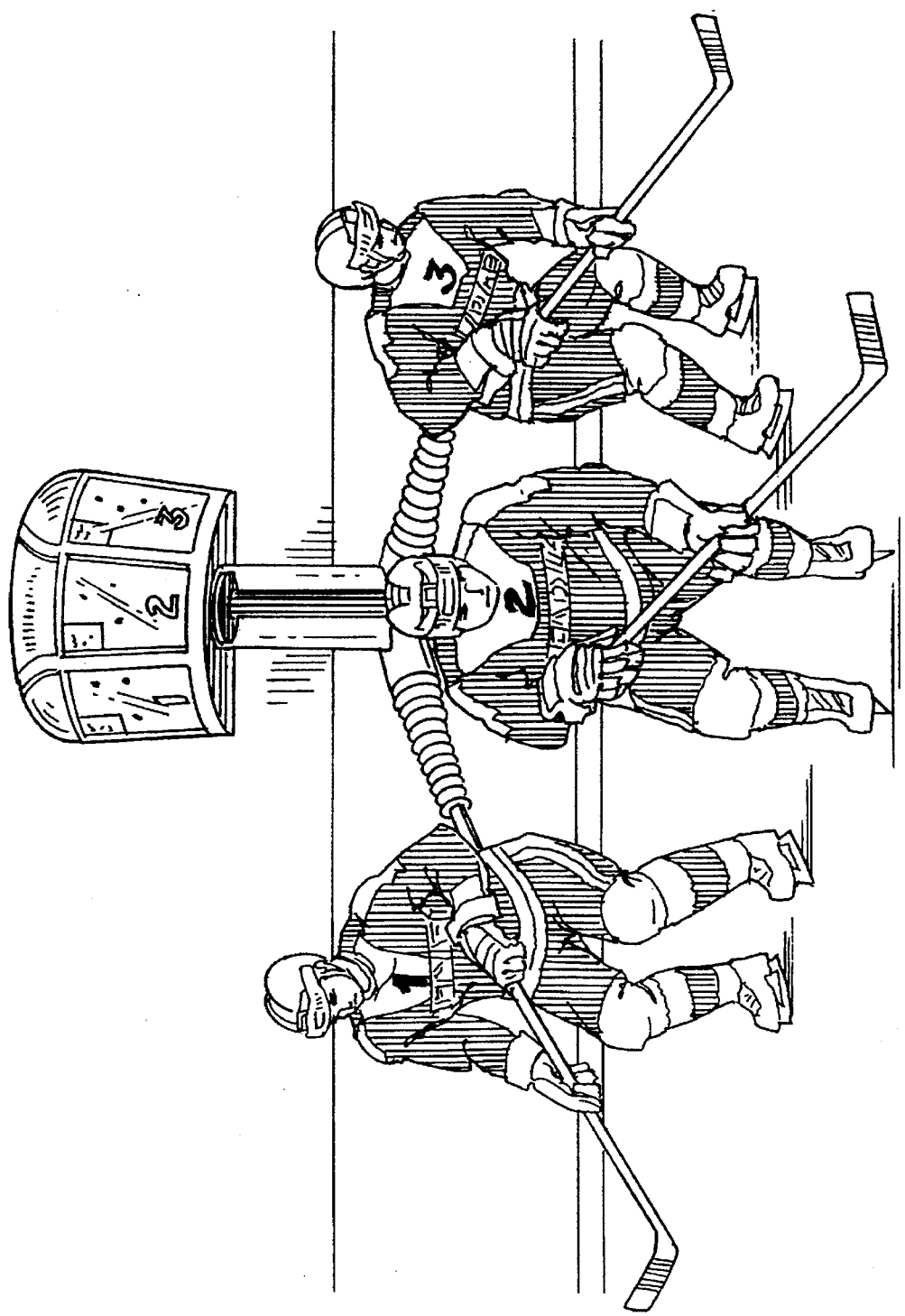
FIG. 7 is a front view of three robots in fixed positions for use as checking targets (when practicing form or measuring force of impact or both).

The content of training sessions is easily predetermined and precisely controlled by instructors and trainers. In addition to varying the number of robots on the ice during a training session, individual arrays or patterns of movement and speed of the robots can be controlled by a computer program. The instructor or player makes selections from a menu that consists of pre-programmed patterns (or "scenarios") for specific skating formations which will be executed by individual robots or teams of robots. These programmed formations can be changed and varied during training or remain fixed throughout the practice session. This allows for programmed drills as well as a more "free-style" training mode for developing play set up and play react training. In addition, robots may be used in a relatively fixed position (FIG. 7) as checking targets where lateral impact force may be applied against the robots. These robots are positioned in various stances so that they can be checked, i.e. physically "contacted" by skaters.

Regarding the above description, it is important to observe that ice hockey is a dynamic sport. Controlled, preprogrammed robots will enhance training and instruction in ice hockey because robots can be made to repeatedly and precisely perform moves and maneuvers encountered during actual play. Robots can therefore supply simulated dynamism without the drawbacks, delays, mis-executions, and other drawbacks that often accompany having other skaters (or, for example, orange traffic cones) serve as objects for practice purposes.

Robots can repeat the opponents' "ideal" plays and maneuvers (even those that are rarely encountered or are known to be used by particular opponents) so that the performance of students/skaters can be perfected. In existing practice sessions a player usually practices opposite the instructor or another player(s). Since a player or instructor is prone to human error or simply fatigue, maneuvers and skills cannot be repeated in a desired optimal fashion. Players may learn "bad habits" while playing opposite a less than ideal opponent or by emulating a less than ideal example. Use of this invention will enable players to practice and to repeat skills and plays against an opposing robot or team of robots that can perform in a consistent manner every time. For ice hockey instructors, trainers, coaches, and players the development of skills will be enhanced by the use of robots (as adjuncts to live play, i.e. to supplement not supplant live play) for improving fundamentals as well as for learning more complex plays and maneuvers.

The foregoing details specific embodiments of the present invention. However, those skilled in the art will realize that further modifications may be made to the technologies or structures mentioned without departing from the scope of the invention. It is intended by this patent and the appended claims to encompass all such changes and modifications which fall within the spirit of this invention.

I claim:

1. An electro-mechanical robot comprising:
    an armature comprising a mechanically-resilient material covered by a high impact padding; said armature and said padding in combination resembling a human figure;
    suspension means coupled to the armature at a distal end; and
    movement means coupled to a proximal end of the suspension means for enabling movement of the armature at variable speeds along an electrified track and above a hockey surface.

2. The electro-mechanical robot of claim 1 further comprising an electrified mesh of sensor chips disposed about the armature for measuring impact when contacted.

3. The electro-mechanical robot of claim 2 further comprising means for transmitting data from the sensor chips to a computer.

4. The electro-mechanical robot of claim 3 further comprising means for storing the sensor data and means for displaying the sensor data on a computer screen.

5. The electro-mechanical robot of claim 4 further comprising means for recording video images, said images being displayed concurrently with said sensor data on said computer screen.

6. The electro-mechanical robot of claim 1 further comprising a computer for controlling movement of the robots along the electrified track.

7. The electro-mechanical robot of claim 1 further comprising:

a hockey uniform disposed about the armature and padding; and a pair of arms coupled to the armature and adapted for holding a hockey stick; said arms being movable relative to said armature for simulating actual hockey player stickholding positions;

a video camera coupled to the armature for capturing video images of interactions between the robot and activity on the hockey rink.

8. The electro-mechanical robot of claim 1 wherein the mechanically resilient material is selected from a group of materials consisting of plastic, metal, metal alloys, and composite materials.

9. The electro-mechanical robot of claim 1 wherein the movement means enables movement of the armature in horizontal and vertical directions relative to the hockey surface.

10. The electro-mechanical robot of claim 1 wherein the movement means comprises a motorized car.

* * * * *